F. A. SAUNDERS.
CONCRETE COOKER.
APPLICATION FILED JAN. 7, 1918.
1,349,784. Patented Aug. 17, 1920.
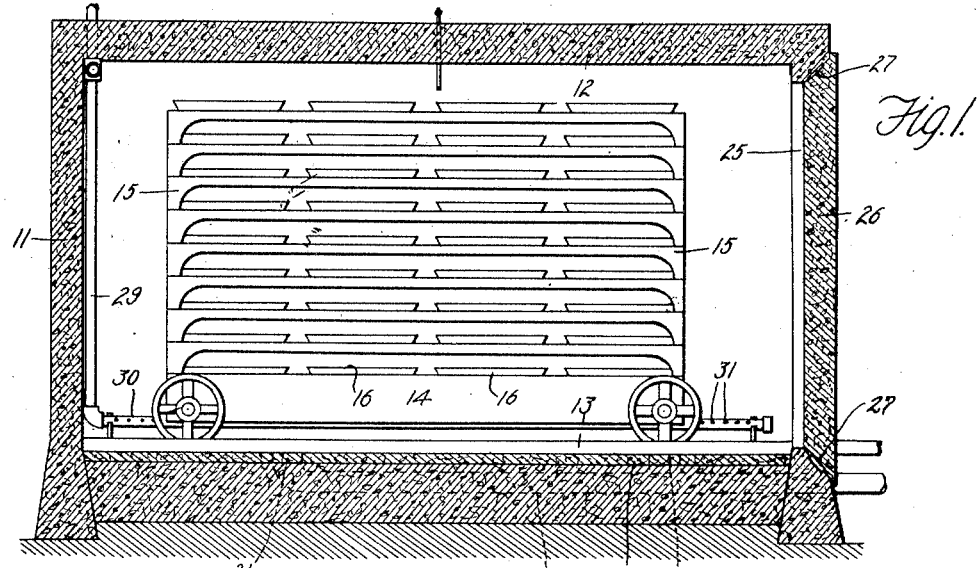
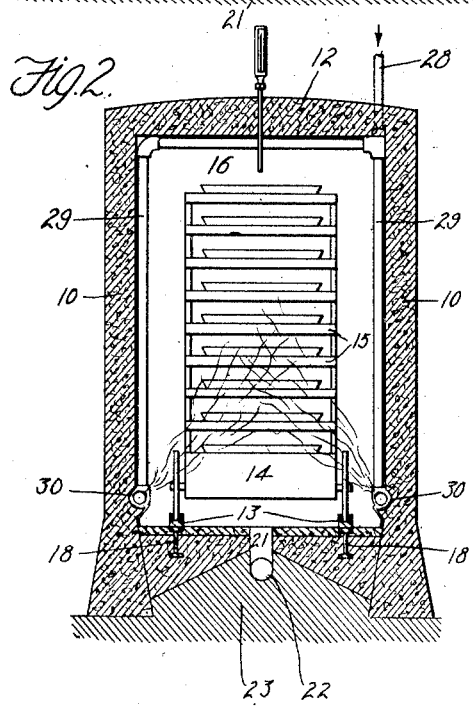
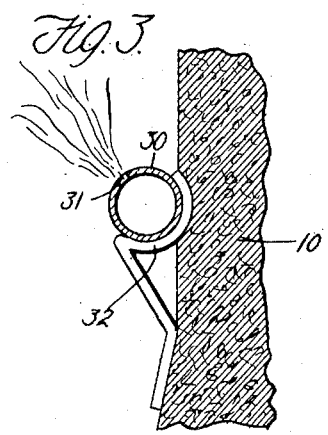
Inventor
Fletcher A. Saunders
by
his Attorney

UNITED STATES PATENT OFFICE.

FLETCHER A. SAUNDERS, OF SAN PEDRO, CALIFORNIA.

CONCRETE COOKER.

1,349,784.	Specification of Letters Patent.	Patented Aug. 17, 1920.

Application filed January 7, 1918. Serial No. 210,634.

*To all whom it may concern:*

Be it known that I, FLETCHER A. SAUNDERS, a citizen of the United States, residing at San Pedro, in the county of Los Angeles, State of California, have invented new and useful Improvements in Concrete Cookers, of which the following is a specification.

This invention relates to cooking devices, and particularly to those in which cooking is done on a large scale; and further particularly to cookers in which steam heat is used. And it is an object of this invention to provide an efficient cooker in which articles may be cooked in large quantity, and most thoroughly and delicately cooked, retaining all their original flavors and aromas without acquiring any foreign taste or odor.

It has been common heretofore to use steam cookers heated with steam coils, or by live steam, the walls of the cooker being made of iron or other suitable similar material. I have found that the use of an exposed concrete wall gives results unattainable by other materials; so that, using a cooker made of concrete, the concrete being exposed interiorly, in combination with means for discharging live steam directly into the interior, I am enabled to cook articles on a large scale in the most delicate manner, retaining the most delicate aroma and flavors of food, and without injecting any foreign odors or flavors into the food. Furthermore, I find I am able to cook food in much less time and with much less heat expenditure than by any other method or apparatus known to me.

A detailed description of my improved cooker follows; from which the general features of my invention will be best understood. I illustrate a preferred form of cooker in the accompanying drawings in which—

Figure 1 is a vertical longitudinal section; Fig. 2 is a vertical cross section; and Fig. 3 is an enlarged detail section showing the arrangement and support of a steam distributing pipe.

The concrete or similar walls 10, 11 and 12 which inclose the cooker chamber may be made of any desirable size and any suitable thickness. These walls are not interiorly covered; the concrete itself is exposed to the live steam discharged into the chamber. The cooker chamber itself may preferably be made rectangular and as long as desirable; rails 13 being provided on which trucks 14 may be run into the chamber. Such trucks may carry trays 15 to support the receptacles 16 which carry the food. These receptacles may be of any desired kind, either perforate or imperforate, as is suitable. The rails 13 may be mounted upon beams 18 which are set below the concrete floor 20. The concrete floor may have, at any suitable point or points, drainage openings 21 which communicate with a drain 22 to carry off the water and other liquids. Or the drainage water may be carried away in any suitable manner. A door opening 25 is closed by door 26, a joint being formed at 27 between the door and the wall of the chamber so as to make a steamtight fit. The inner surfaces of the walls and the surfacing of floor 20 are made water and oil proof, so that they will not absorb moisture or oil. The cooker is thus rendered most highly sanitary and clean.

Steam may enter through a pipe at 28 which leads to two branch pipes 29 leading to the two horizontal distributing pipes 30 which extend along the opposite side walls of the chamber near the bottom. These pipes 30 are perforated as shown at 31; and the perforations are so placed that the steam is thrown upwardly and inwardly across the chamber. The steam jets travel diagonally upwardly to the upper part of the chamber and then the condensed steam drops down to the floor, the condensate running out of the draining openings. By such an arrangement of the steam pipes, I find that the cooker chamber is uniformly heated and the food is efficiently cooked and the condensate is easily carried off. There is one part of the cooker chamber which is cooler than the other parts. In the space below the steam jets, close to the floor of the chamber, there is a lower temperature than elsewhere. The temperature in all other parts of the chamber is substantially uniform; but here it is lower. And it is in this space that the steam condenses, or where the condensate gathers. It is here that the oil or other liquids which may come out of the fish also gathers and condensates. This water, oil, and other liquids are carried out through the drainage into suitable settling basins where the oils may be recovered. Fish may be cooked in perforated trays or dishes so that the oil, blood, and other liquids which are cooked out, will escape and can be recovered and saved in the manner herein explained.

The two steam distributing pipes 30 are set in sheet metal bracket troughs 32, as is more particularly shown in Fig. 3.

The cooker may of course be provided with any and all of those adjuncts usually used in steam cookers, such as a recording thermometer to record the inner temperature of the chamber, a thermometer to measure the temperature of the ingoing steam, etc.

I have illustrated herein a cooker of relatively short length. In actual practice my cooker may be made of any suitable size; and for cooking fish and the like the cookers are preferably made long enough to carry a half dozen or more of the trucks illustrated in the drawings, standing end to end on the track. Such a cooker will hold from three to five tons of fish and will cook the fish most thoroughly, uniformly and completely.

I find by actual experience that my cooker excels others in many respects. I find, for instance, in cooking fish, that my cooker accomplishes the complete cooking of fish in about one-third to one-half the time required in a cooker with iron walls; and completes this cooking at about one-sixth the expense for fuel. In actual practice I find that I can cook a full charge of from three to five tons of fish in as short a time as seventy-five minutes, although one hour and forty-five minutes I find is probably the best time to most thoroughly and uniformly cook the fish. Moreover, fish which has been thus cooked in my cooker has no iron taste which it usually has when cooked in an iron walled cooker; in fact, it has nothing but the proper fish taste and odor, and the full flavor and aroma of the fish are remarkably preserved. Furthermore, I find that the fish are more uniformly cooked than is usually the case with other cookers. I ascribe these advantages to the use of live steam in a concrete walled cooker in which the concrete is interiorly exposed. The particular kind or character of the concrete does not much affect the result.

Having described a preferred form of my invention, I claim:

1. In a cooker for fish and like articles of food, a chamber having interiorly exposed concrete walls, means to introduce live steam into the chamber and in contact with the exposed concrete walls thereof, and means to support articles of food to be cooked therein exposed to the radiant heat of the walls and to the direct action of and contact with the steam.

2. In a cooker, a chamber having interiorly exposed concrete walls, means to support articles to be cooked therein, and means to introduce live steam into the chamber, said last mentioned means embodying steam distributing pipes extending along the lower parts of opposite side walls of the chamber and having perforations through which the live steam is directed diagonally upwardly and inwardly into the central upper parts of the chamber, said supporting means holding the articles in the central and upper parts of the chamber.

3. In a cooker for fish and like articles of food, a substantially rectangular and elongated chamber having interiorly exposed concrete walls and a door at one end thereof, tracks extending through the door and into the chamber, means to introduce live steam into the chamber and in contact with the exposed concrete walls thereof, and means on said tracks to support articles of food to be cooked therein exposed to the radiant heat of the walls and to the direct action of and contact with the steam.

4. In a cooker, a chamber, means to support articles to be cooked in the central and upper parts of the chamber, means to introduce live steam into the chamber embodying steam distributing pipes extending along the lower parts of opposite side walls of the chamber and having means discharging steam diagonally upwardly and inwardly into the central and upper parts of the chamber, and discharge means for condensed steam in the lower part of the chamber.

In witness that I claim the foregoing I have hereunto subscribed my name this 28th day of December, 1917.

FLETCHER A. SAUNDERS.

Witness:
VIRGINIA BERINGER.